United States Patent
Bosch et al.

(10) Patent No.: US 8,923,813 B2
(45) Date of Patent: *Dec. 30, 2014

(54) SYSTEM AND METHOD FOR SECURING A BASE STATION USING SIM CARDS

(75) Inventors: Peter Bosch, Amstelveen (NL); Alistair Urie, Issy-les-Moulineaux (FR); Sarvar Patel, Montville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 78 days.

This patent is subject to a terminal disclaimer.

(21) Appl. No.: 13/620,773

(22) Filed: Sep. 15, 2012

(65) Prior Publication Data

US 2013/0012164 A1 Jan. 10, 2013

Related U.S. Application Data

(62) Division of application No. 13/473,982, filed on May 17, 2012, which is a division of application No. 12/397,383, filed on Mar. 4, 2009, now Pat. No. 8,249,553.

(60) Provisional application No. 61/033,594, filed on Mar. 4, 2008, provisional application No. 61/033,882, filed on Mar. 5, 2008.

(51) Int. Cl.

| | |
|---|---|
| *H04M 1/66* | (2006.01) |
| *H04M 1/00* | (2006.01) |
| *H04W 4/00* | (2009.01) |
| *H04W 12/02* | (2009.01) |
| *H04L 29/06* | (2006.01) |
| *H04W 12/06* | (2009.01) |
| *H04W 84/04* | (2009.01) |
| *H04W 88/08* | (2009.01) |

(52) U.S. Cl.
CPC ........... *H04W 12/02* (2013.01); *H04L 63/0428* (2013.01); *H04L 63/0853* (2013.01); *H04W 12/06* (2013.01); *H04W 84/045* (2013.01); *H04W 88/08* (2013.01); *H04L 63/0272* (2013.01); *H04L 63/166* (2013.01)
USPC ........ 455/410; 455/411; 455/435.1; 455/561; 455/558

(58) Field of Classification Search
USPC ........................ 455/410, 411, 435.1, 561, 558
See application file for complete search history.

(56) References Cited

U.S. PATENT DOCUMENTS

| | | | |
|---|---|---|---|
| 5,778,322 A | 7/1998 | Rydbeck | |
| 5,864,757 A * | 1/1999 | Parker | ........................... 455/418 |
| 7,248,886 B1 | 7/2007 | Ljungstroem et al. | |
| 8,249,553 B2 * | 8/2012 | Bosch et al. | .................. 455/410 |

(Continued)

OTHER PUBLICATIONS

International Preliminary Report on Patentability, International Application No. PCT/US2009/035951, Sep. 7, 2010.

(Continued)

*Primary Examiner* — Jinsong Hu
*Assistant Examiner* — Dung Hong
(74) *Attorney, Agent, or Firm* — Fay Sharpe LLP

(57) ABSTRACT

Methods and systems are provided for securing integrated base stations, such as base station routers (BSRs), in which a SIM card is operatively coupled with a secured portion of a base station and a secure association is established therebetween to facilitate encryption key exchange between the secured portion of the base station and a core network.

21 Claims, 4 Drawing Sheets

(56) References Cited

U.S. PATENT DOCUMENTS

| | | | |
|---|---|---|---|
| 2002/0187808 A1* | 12/2002 | Vallstrom et al. | 455/558 |
| 2003/0220096 A1 | 11/2003 | Smeets | |
| 2007/0230707 A1 | 10/2007 | Blom et al. | |
| 2007/0271458 A1 | 11/2007 | Bosch et al. | |
| 2007/0277035 A1 | 11/2007 | Patel et al. | |
| 2008/0080399 A1 | 4/2008 | Wang et al. | |
| 2008/0254833 A1* | 10/2008 | Keevill et al. | 455/558 |
| 2009/0287922 A1* | 11/2009 | Herwono et al. | 713/155 |

OTHER PUBLICATIONS

International Search Report, International Application No. PCT/US2009/035951, Apr. 14, 2009.

Written Opinion, International Application No. PCT/US2009/035951, Apr. 14, 2009.

"Extensible Authentication Protocol Method for $3^{rd}$ Generation Authentication and Key Agreement (EAP-AKA)", RFC 4187, 2006.

* cited by examiner

SYSTEM AND METHOD FOR SECURING A BASE STATION USING SIM CARDS

RELATED APPLICATIONS

This application is a divisional of, and claims priority to and the benefit of, U.S. patent application Ser. No. 13/473,982, which was filed May 17, 2012, entitled SYSTEM AND METHOD FOR SECURING BASE STATION USING SIM CARDS, which is a divisional of, and claims priority to and the benefit of, U.S. patent application Ser. No. 12/397,383, which was filed Mar. 4, 2009 now U.S. Pat. No. 8,249,553, entitled SYSTEM AND METHOD FOR SECURING BASE STATION USING SIM CARDS, and also claims priority to and the benefit of Provisional Patent Application Ser. Nos. 61/033,594, which was filed Mar. 4, 2008, entitled SYSTEM AND METHOD FOR SECURING BASE STATION USING SIM CARD and 61/033,882, which was filed Mar. 5, 2008, entitled SYSTEM AND METHOD FOR SECURING BASE STATION USING SIM CARD, the entireties of which are hereby incorporated by reference.

This application is related to U.S. patent application Ser. No. 11/419,626, filed May 22, 2006, entitled "AUTHENTICATING A TAMPER-RESISTANT MODULE IN A BASE STATION ROUTER", the entirety of which is hereby incorporated by reference.

FIELD OF THE INVENTION

This invention relates generally to the field of networked communications, and more particularly to methods and systems for securing base stations using SIM cards.

BACKGROUND OF THE INVENTION

Mobile communications provides access by mobile phones, PDAs, portable computers and a variety of other user equipment to communicate via radio access networks (RANs) to core networks for connection to other mobile devices, the Internet, and conventional land-line phones. The RANs are distributed over a geographical area typically divided into cells that are served by a corresponding base station. Base stations communicate over an air interface with the user equipment, with several base stations being connected to a radio network controller (RNC) or base station controller (BSC) that is connected to one or more core networks. In the typical situation, secure communications for users of the system may be provided through encryption and decryption at the base station. Communications between the core network and the base station is encrypted and communications between the base station and the wireless user equipment is also encrypted. In some large wireless networks security for the encryption and cipher keys is provided by virtue of the base stations themselves being physically protected (e.g., under lock and key) to prevent unauthorized monitoring of communications traffic to and from the base station (the RNC performs encryption in UMTS, although the eNB performs encryption for 3GPP long term evolution (3GPP LTE), where a secure cell-site vault portion can be provided for securing the encryption). Integrated base stations (e.g., base station routers or BSRs) are being designed to operate in residential or small business environments to form micro cells, pico cells, or femto cells. The integrated base station is designed to be connected to the service provider's network via broadband (such as DSL or cable), and effectively allows service providers to extend coverage in small locations, such as high density cities, or inside buildings where access would otherwise be limited or unavailable using convention base stations. A femto cell generally provides the functionality of a base station but extends it to allow a simpler, self contained deployment, for example, a UMTS femtocell containing a Node B, RNC and GSN with Ethernet for backhaul. As these integrated base stations are installed and maintained by a subscriber, however, they are not physically controlled by the network operator. Accordingly, there is a need for improved methods and systems for securing base station routers or other secured devices. Note that a 3GPP LTE eNB is considered to be an integrated base station.

SUMMARY OF THE INVENTION

The following is a summary of one or more aspects of the invention to facilitate a basic understanding thereof, wherein this summary is not an extensive overview of the disclosure and is intended neither to identify certain elements of the invention, nor to delineate the scope of the disclosure. Rather, the primary purpose of the summary is to present some concepts of the disclosure in a simplified form prior to the more detailed description that is presented hereinafter. The various aspects of the present disclosure relate to systems and methods for securing base stations in which a SIM card is operatively coupled with a secured portion of a base station and a secure association is established therebetween to facilitate authentication between the secured portion of the base station and a core network.

One or more aspects of the disclosure relate to a base station for providing wireless communications between wireless mobile terminals and a core network. In one exemplary implementation, the integrated base station is a base station router for a femto cell, pico cell, micro cell or other type of cell. In another exemplary implementation, the integrated base station is a 3GPP LTE eNB base station. The integrated base station comprises a subscriber identity module (SIM) card operatively coupled with the device and including a first local tunnel management component and a first security management component operatively coupled with the core network to facilitate one or more security functions in the base station. In the remainder of this disclosure, base station, integrated base station and base station router as synonymous. The base station further includes a secure portion (e.g., a cell-site vault) that operates in concert with the first tunnel management component to establish a secured association between the SIM card and the cell-site vault. The base station further comprises an unsecure portion which includes a radio interface operative to communicate with wireless mobile terminals, and a line interface operative to communicate with the core network.

In certain further aspects of the disclosure, the security function components perform encryption or decryption security operations with respect to communications packets handled by the base station, such as a first encryption component to perform encryption and decryption security operations with respect to communications packets transferred between the base station and a radio interface of a wireless mobile terminal, and a second encryption component to perform encryption and decryption security operations with respect to communications packets transferred between the base station and a line interface of the core network. In one embodiment, the security management components facilitate generation of session keys for the one or more security function components.

In accordance with other aspects of the disclosure, a SIM card is provided for facilitating security operations in a base station coupled with a core network. The SIM card comprises a security management component operative to establish a secured association between the SIM card and a secure portion of the base station.

Still other aspects of the disclosure provide a method for securing a base station using a subscriber identity module (SIM) card. The method includes operatively coupling a SIM card to the base station, establishing a secure tunnel between a secure portion of the base station and an authentication component of a core communications network, establishing a secure association between the SIM card and the secure portion of the base station, and confirming to the authentication component establishment of the secure association between the SIM card and the secure portion of the base station. In certain embodiments, the secure tunnel is established between the secure portion of the base station and the authentication component of the core communications network via an IKE protocol, a TLS protocol, or an AKA procedure. In certain embodiments, moreover, establishing the secure association is established between the SIM card and the secure portion of the base station includes executing an AKA (e.g. UMTS-AKA) procedure.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which.

DETAILED DESCRIPTION

Figure 1:
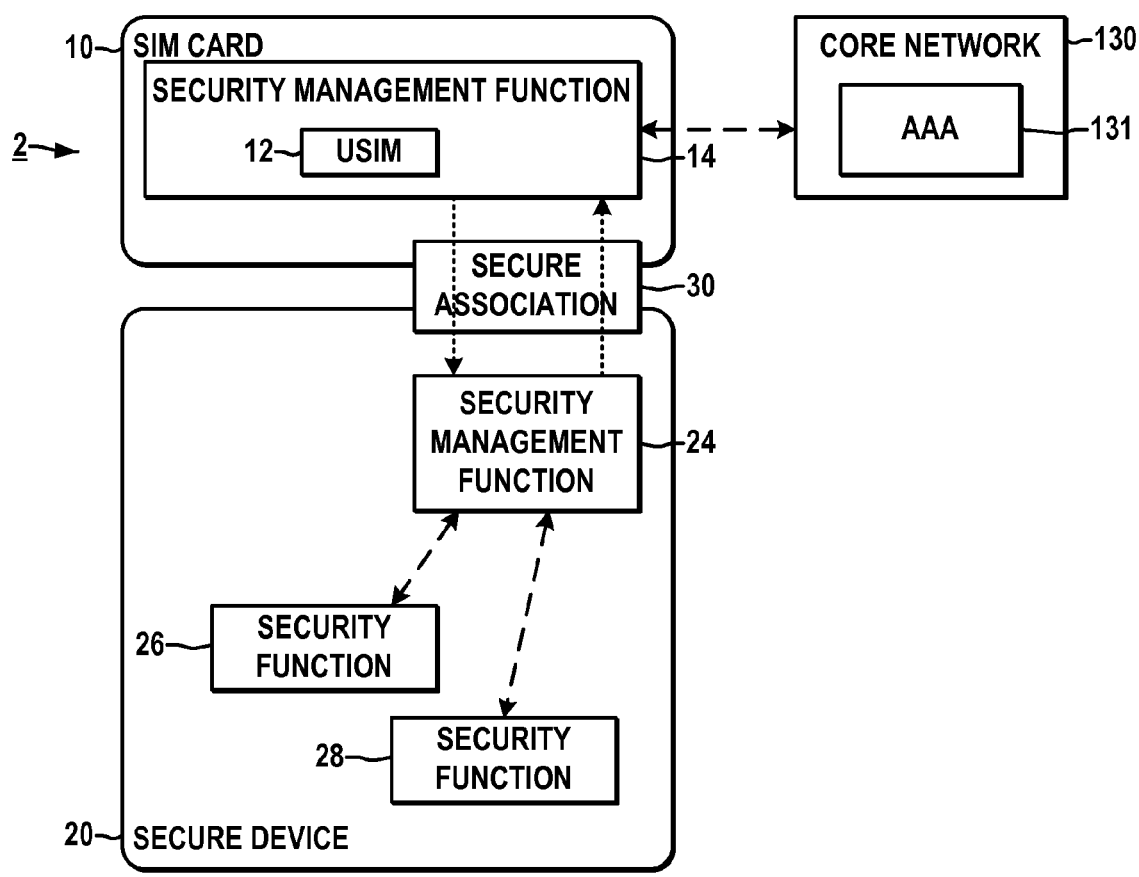
FIG. 1 is a schematic diagram illustrating an exemplary system for facilitating security operations in a base station or other secured device using a SIM card in accordance with one or more aspects of the present disclosure.

Referring initially to FIG. 1, several embodiments or implementations of the various aspects of the present disclosure are hereinafter illustrated and described in conjunction with the drawings, wherein like reference numerals are used to refer to like elements. An exemplary system 2 is illustrated in FIG. 1 for facilitating security of a device 20, such as a base station or the system 2 may be implemented in other secured device applications. The system 2 includes a subscriber identity module (SIM) card 10 operatively coupled with the device 20, where the SIM card 10 includes a first security management component 14 operatively coupled with a core network or other external system to facilitate one or more security functions in the device 20. Note that in one embodiment component 14 executes the USIM program application 12. The device 20 also includes one or more security function components 26 and 28 that perform security operations with respect to data processed or used by the device 20.

Figure 2:
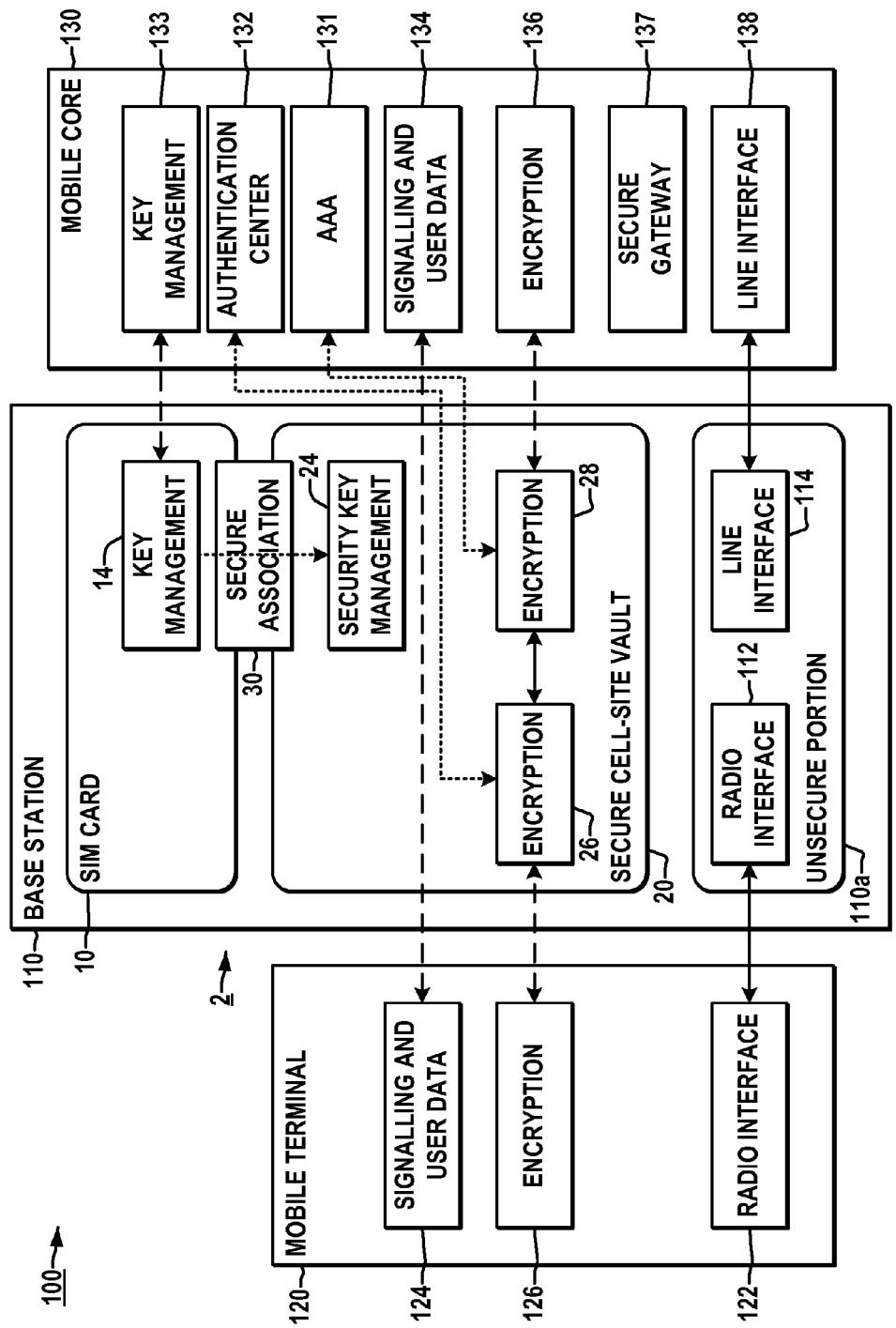
FIG. 2 is a system level schematic diagram illustrating an exemplary base station equipped with a SIM card for security operations in supporting communications in a wireless network.

FIG. 2 illustrates a wireless communications system 100 including one possible implementation of the system 2 in association with a base station 110 for providing wireless communications between wireless mobile terminals 120 and a core network 130. The base station 110 in one possible embodiment is an integrated base station for a femto cell, pico cell, micro cell, or other type of cell although not a strict requirement of the present disclosure. The core network 130 is operated by a wireless operator and includes e.g. an AAA or other authentication component 131, an authentication center 132, a key management component 133, a secure gateway (SEGW) 137, a line interface 138, and other functional components so as to provide for packet exchange with the base station 110 via a line interface 138 and exchange of signaling and user data via component 134, where the core network 130 performs encryption/decryption via an encryption component 136 for packets exchanged with the base station 110. The mobile terminal 120 provides a signaling and user data component 124 along with an encryption component 126 for encryption/decryption of packets exchanged with the base station 110, and a radio interface 122. In another embodiment, parts of the core network component 134 can execute inside the cell-site vault 20 in the integrated base station 110.

The authentication center 132 authenticates elements of the wireless communication system 100, and preferably stores secret keys associated with the mobile terminals 120 for use in authenticating communications between the core network 130 and the terminals 120. The authentication center 132, moreover, stores a secret key used to authenticate the secured vault portion 20 of the base station 110, for example, with one copy of the key being provisioned to the authentication center 132 and another copy being pre-provisioned to the base station vault 20. Alternatively, the authentication center can hold on to the public key while the secured vault portion 20 stores the private part of the public/private key pair. These keys are then used to authenticate communications between the wireless communication system 100 and the base station 110 using well-known secure tunnel establishment procedures such as TLS, SSL or the various AKA algorithms.

The base station 110 comprises a secured portion 20 and an unsecured portion 110a, where the unsecured portion 110a is operatively connected via a radio interface 112 to corresponding radio interfaces 122 of mobile terminals 120 proximate the base station 110, and is also connected to a core network 130 via a line interface 114 in the unsecured portion 110a that interoperates with a line interface 138 of the core network 130. The base station 110 may be any suitable hardware, software, firmware, programmable logic, etc., or combinations thereof, whether unitary or distributed among two or more entities, wherein all such implementations are contemplated as falling within the scope of the present disclosure and the appended claims. Various aspects of the disclosure are illustrated and described in terms of software, or algorithms, and/or symbolic representations of operations on data bits within a computer memory, by which ordinary skilled artisans convey the substance of their work. As such, algorithms, scripts, computations, and other operations of the described components may be implemented as computer implemented steps via programmed software core or other programming or configuration to provide a desired result, where such steps involve manipulation or transformation of physical quantities such as stored memory states in a computer memory. In particular, certain embodiments may include software components operating according to programmed computer-executable instructions stored in an electronic memory, which operate on messages or packets sent to or received from the core network 130 and or the mobile terminal(s) 120, which data may be likewise stored in an electronic memory at least for a time, wherein the packets and data described herein may be of any suitable form including without limitation optical, electrical, or magnetic signals capable of being stored, transferred, combined, compared, and otherwise manipulated, and wherein these may be referred to in various terms such as bits, values, elements, symbols, characters, terms, numbers, etc.

Unless specifically stated otherwise, or as is apparent from the discussion, terms such as "processing" or "computing" or "calculating" or "determining" or "displaying" or the like, refer to the action and processes of a computer system, or similar electronic computing device or devices, that manipulate and transform data represented as physical, electronic quantities within the computer system's registers and memories into other data similarly represented as physical quantities within the computer system memories or registers or other such information storage, transmission or display devices. In addition, the various software implemented aspects of the present disclosure are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, wireless, or some other suitable transmission medium known to the art or combinations thereof, wherein the present disclosure is not limited by these aspects of any given implementation.

The exemplary integrated base station 110 provides wireless connectivity to the user equipment 120 according to Universal Mobile Telecommunication System (UMTS) standards and/or protocols, although other embodiments of the present disclosure are possible in which alternative standards and/or protocols (e.g., Global System for Mobile communication (GSM), 3GPP LTE, 3GPP code division multiple access (CDMA), or WiMAX standards and/or protocols) may be implemented in portions of the wireless communication system 100. In addition to the secure cell-site vault 20 and the unsecured portion 110a, the base station 110 comprises a subscriber identity module (SIM) card 10 in accordance with various aspects of the present disclosure. The SIM card 10 is operatively coupled with the vault 20 and includes a first security management component 14 for key management. The key management component 14 is operatively coupled with the core network 130 to facilitate the association of a SIM card with a secure cell-site vault. In the illustrated implementation, the secure cell-site vault 20 is generally as described in Applicants' prior U.S. patent application Ser. No. 11/419,626, filed May 22, 2006, entitled "Authenticating a Tamper-Resistant Module in a Base Station Router", the entirety of which is hereby incorporated by reference. The vault 20 includes one or more security (e.g., encryption/decryption) functions 26 and 28, and a second security management component (e.g., key distribution) 24.

In operation, a secure association 30 is established between the SIM card 10 and the cell-site vault 20 during initialization of the base station 110, with the security key management component 14 and the key management component 24 facilitating the execution of the UMTS-AKA procedure between the SIM card and the AAA infrastructure. The procedure establishes a unique binding between SIM card, the secure cell-site vault, the AAA infrastructure and the SEGW. The security function component 28 performs security functions with respect to communications packets handled by the base station 110 including encryption/decryption operations performed on communications packets sent to the mobile core 130 via the line interface 114, as well as encryption/decryption operations performed on communications packets received at the line interface 114. In the illustrated implementation, the first encryption component 26 performs encryption and decryption operations with respect to communications packets transferred between the base station 110 and the radio interface 122 of the mobile terminal 120 and the second encryption component 28 performs encryption and decryption security operations with respect to communications packets transferred between the base station 110 and a line interface 138 of the core network 130. Other implementations are possible, in which the functions of the two security components 26 and 28 are implemented by a single component, or these functions may be distributed across more than two components.

The SIM card 10 facilitates the security operations in the base station 110 by providing for operator configurable control of the provisioning of the base station 110, which is particularly advantageous for base stations 110 that are sold and thereafter operated and maintained by the user. In practice, the operator may provision the SIM card 10 for operative connection to a given base station 110 at a point of sale or thereafter by the user, where the SIM card 10 performs the key management and other portions of the management features to effectively provision the base station 110 with operational information or data to facilitate (security) processing in the base station device 110, and the SIM card 10 may perform other functions, including informing the base station 110 of which mobile core endpoint to use.

The present disclosure allows the SIM card advantages with respect to controlled provisioning while providing the actual security processing within the secured cell-site vault 20 of the base station 110. This solution provides an authentication mechanism to the deploying operator that is intimately tied with the base station 110 itself (e.g. the base station processing cell-site vault 20) and does not travel with the SIM card 10, thereby allowing the operator to decommission a base station 110 if needed by decommissioning the base station's SIM card. In this manner, the present disclosure provides a unique identity in the form of a secret key that is part of the initialization sequence of the base station 110 together with secure association establishment to grant or deny access to the operator's network 130. If the core network 130 access is not granted, the base station 110 cannot be used for any other operator since SIM card authentication is part of the base station's initialization sequence.

The present disclosure extends the secured cell-site vault concept presented in Applicant's previous application Ser. No. 11/419,626 with the advantages of the SIM card 10 through authentication of the SIM card to the vault and vice versa. Using this distributed security environment it is now possible to safely perform provisioning of a base station 110 with credentials via the SIM card 10.

Figure 3A:
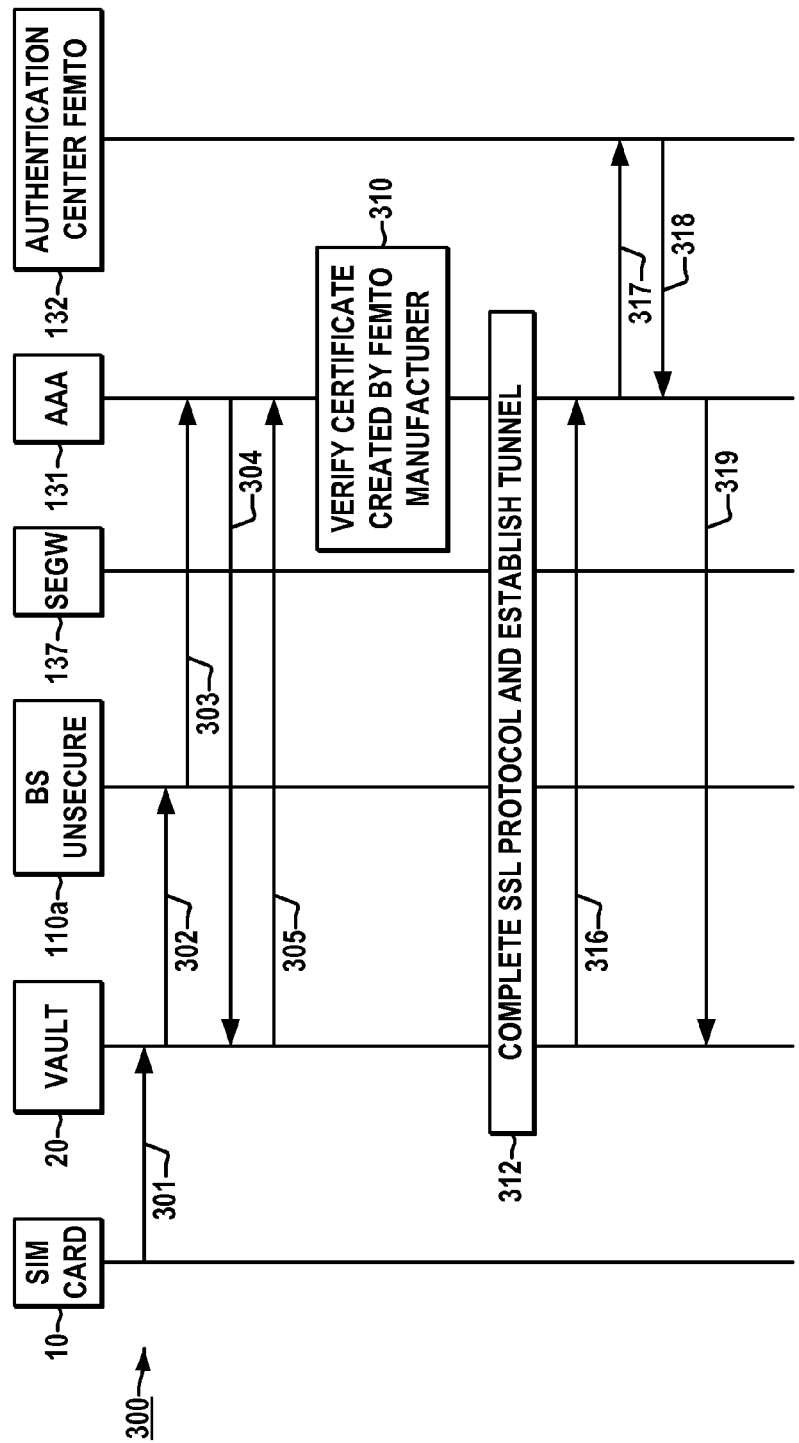
FIGS. 3A and 3B depict a signal flow diagram illustrating another exemplary provisioning of the base station and tunnel establishment using the SIM card in accordance with further aspects of the disclosure.
Figure 3B:
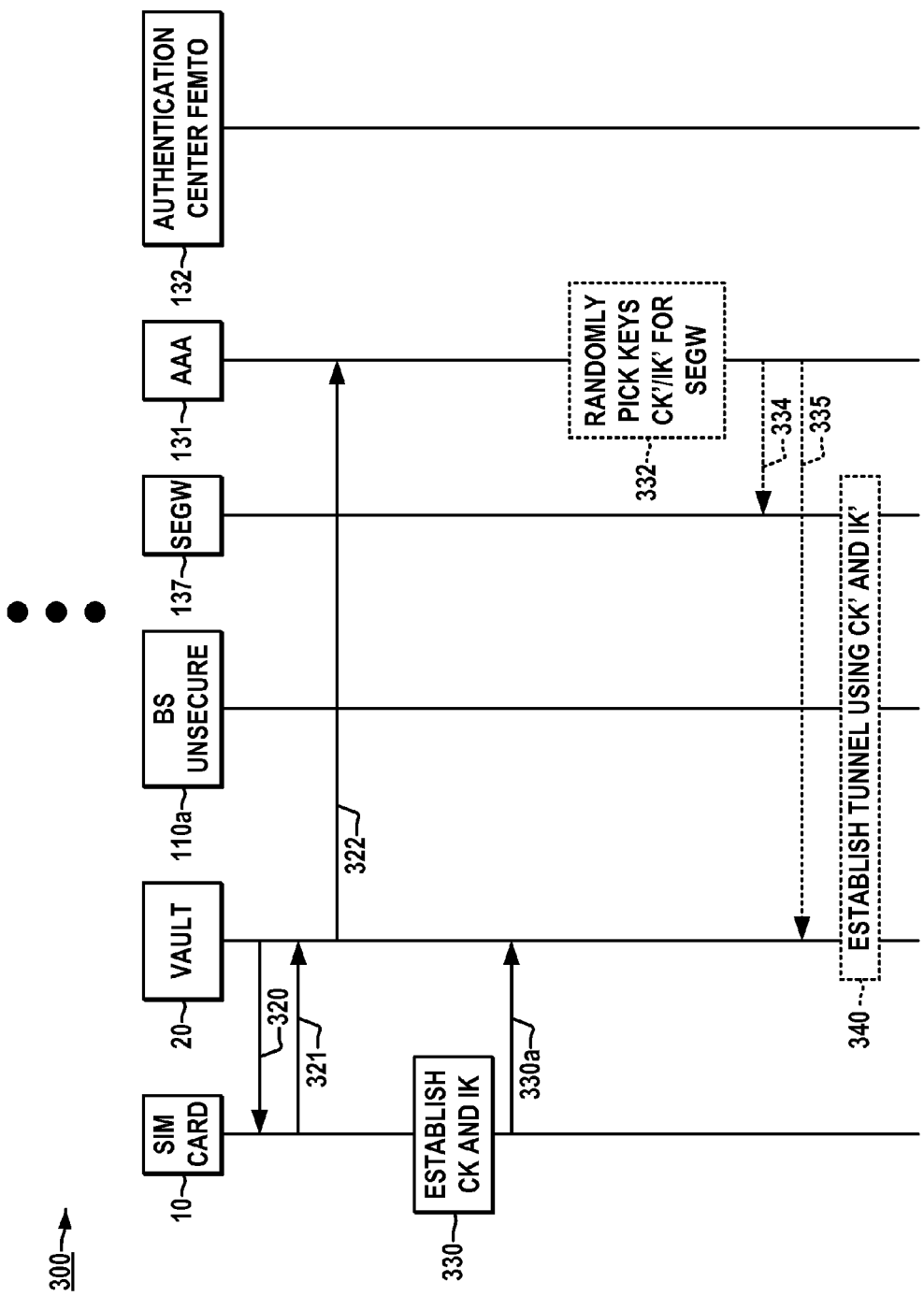

Referring to FIGS. 3A and 3B, an exemplary signal flow diagram 300 is provided, which illustrates an exemplary technique for provisioning the base station and security association establishment using the SIM card in accordance with further aspects of the disclosure, as well as optional establishment of a secondary security tunnel. The illustrated example operates to establish secure tunnels between the cell-site vault 20 and the gateway (SEGW) 137, between the vault 20 and the AAA 131, and a security association between the vault 20 and the SIM card 10, by which existing SIM cards 10 may be used having authentication and key agreement (AKA) functions implemented through the USIM program. In this implementation, the SIM card 10 may incorporate software changes to be able to encrypt and decrypt messages, but no new functions or significant changes are required for establishing a secure association 30 between it and the cell-site vault 20. This embodiment provides for ease of commercial sale by other than the service provider and deployment by the end user without provisioning long-term secrets in the vault 20 or the AAA component 131. By this design, the base station 110 can be marketed and delivered to the end user outside the control of the service provider/network operator, while the base station vault 20 need not be pre-configured with any secure information specific to the operator.

In operation of this embodiment, the vault 20 and the AAA component 131 may perform public key operations and the SIM card 10 does not. In the case of an integrated base station 110, the base station manufacturer loads appropriate certificates into the cell-site vault 20, and the network operator is provided with only the public keys of the base station manufacturers that will be deployed with the operator's network 130. In one illustrative example, a user purchases a base station 110 from any store (e.g., retailer not owned or operated by a network operator/wireless service provider) and the user separately enters into a subscription with an operator. The network operator ships a base station's SIM card 10 to the user, who then inserts the SIM card 10 in to the base station 110 and begins use. As shown in the signal flow diagram 300 of FIG. 5A, upon power up in the integrated base station 110, the installed SIM card 10 sends a first message 301 to the vault 20 including a SIM_ID. The vault 20 then sends a message 302, 303 to the AAA component 131 via the unsecured portion 110a of the base station 110 to initiate the tunnel establishment, with the message 303 from the unsecure portion 110a to the AAA component 131 including the base station ID. The AAA component 131 then initiates an SSL/TLS [RFC5246, incorporated herein by reference] connection by sending an SSL "Hello" message 304 back to the vault 20.

The vault 20 sends a base station certificate back to the AAA component 131 in a TLS/SSL server hello message 305, wherein the manufacturer of the base station 110 may use a variety of techniques to create a base station certificate including a base station ID, manufacture ID, model ID and/or batch ID, and a public key, and load it into the vault 20. The manufacturer can create the public/private key pair for the integrated base station 110 and load these into the base station 110. In this case, the manufacturer signs the public key, base station ID, manufacture ID, model ID, and/or batch ID with the manufacturer's signing key and loads the signature to the integrated base station 110 before the base station is shipped. Note that alternate mechanisms for provisioning exist.

The AAA component 131 verifies the certificate at 310 including checking the base station ID from the message 305 against a list of acceptable base stations. At 310, the AAA component 131 may look at the base station ID, manufacture ID, model ID, and/or the batch ID to determine whether a given base station 110 is acceptable to the operator's security policies, and may also check for specific blacklisted integrated base stations 110. The AAA component 131 in this implementation is previously provisioned with the base station manufacturer's public key for signature verification and uses the public key to verify if the base station's certificate (and thus the base station's public key) is legitimate. The vault 20 and the AAA component 131 then initiate key exchange and other steps at 312 to complete an SSL/TLS tunnel by which the AAA component 313 has authenticated the cell-site vault 20 and is assured that the base station 110 has a secure vault 20 and that it is acceptable to the network operator's security policies. At this point, the integrated base station 110 has not authenticated the AAA component 131 or matched the SIM card 10 with the operator's AAA component 131, and the component 131 has not authenticated the SIM card 10.

Accordingly, the process 300 continues with the vault 20 sending the SIM_ID to the AAA component 131 in a message 316 inside the SSL/TLS tunnel established at 312 the AAA component 131 then sends a message 317 to the operator's authentication center (AC) 132 requesting that the AC 132 associated with the SIM card 10 to respond with an AKA vector in a reply message 318. With this, the AAA component 131 sends the authentication vector AV with RAND, AUTN, XRES, CK, IK in a message 319 to the vault 20 inside the SSL tunnel. The UMTS-AKA procedure is described in detail in 3GPP 33.102.

Referring also to FIG. 3B, the vault 20 then sends the RAND, AUTN to the SIM card 10 via a message 320, and the SIM card 10 verifies the AUTN and returns the RES value in a message 321 to the vault 20. At this point the cell-site vault 20 can verify RES to XRES and when there is agreement knows that the SIM card 10 has authenticated the AAA component 131 and thus the base station 110 can now trust the AAA component 131. The result of the comparison is signaled to AAA with message 322. In an alternative embodiment, AAA component only transmits RAND and AUTN to vault 20 in message 319 and the RES is forwarded by the vault 20 in a message 322 to the AAA component 131 inside the TLS/SSL tunnel, and the AAA component 131 checks that the RES equals the XRES. In an exemplary normal AKA processing implementation, the CK and IK keys are also returned by the SIM card 10.

At this point the AAA component 131 is assured that this integrated base station 110 has a legitimate SIM card 10 with a SIM_ID attached to the vault 20, and the secured association 30 is established. At 330, the SIM card 10 establishes keys CK and IK and sends these to the vault 20 via message 330a. The AAA component 131 uses the earlier indication of successful completion of the secure association 30 as the establishment of the SIM card 10 on the particular base station 110. Next, standard SSL/TLS mechanisms may be used to establish a secure tunnel between the SEGW and the vault at 340. In one optional implementation, the AAA component 131 randomly picks keys CK' and IK' at 332 for the secure gateway 137 for establishing this second tunnel, and sends these to the keys to the SEGW 137 via a message 334. The AAA component 131 in this implementation also sends the CK' and IK' keys to the vault 20 via a message 335 to establish a vault-SEGW tunnel at 340. In another embodiment, the AAA creates a new session key that it signals to both the SEGW and vault.

In the above described situation, the base station 110 will be operative in association with any operator's AAA component 131 and any legitimate SIM card 10. Other implementations are possible in which the integrated base station operation can be restricted to a specific operator. For example, the base station manufacturer could sign a usage_certificate using its private key stating that only a specific network operator A can use base station ID. The vault 20 in this case will also have the manufacturer's public key for signing verification. After the vault 20 sends the message 305 in FIG. 3A, the AAA component 131 in this implementation sends this 'usage_certificate' to the vault 20 inside the TLS/SSL tunnel and the vault 20 uses the manufacturer's public key to verify it and grant access.

As noted in the above described embodiments, once the SSL/TLS tunnel is established at 312 (FIG. 3A), the AAA component 131 knows that it is talking to a secure vault 20 and that there are no "man in the middle" attackers since the vault 20 acts like a server in SSL/TLS with a server certificate. After the AKA is then performed at 317, 318 and the proper RES is received at 322, the AAA component 131 knows that the legitimate SIM card 10 is attached to the vault 20 and security is complete. The SIM card 10 knows that if it receives a legitimate AUTN in the message 320 which includes a proper AKA sequence number and a MAC, the SIM card 10 can trust the vault 20 and it has established TLS/SSL with the vault 20, since the current valid AUTN is only sent over the TLS/SSL tunnel. If the MAC is incorrect then the connection is rejected, and if the MAC is correct and the sequence number is out of range, then a resync process is initiated. The authentication center 132 and the AAA component 131 are thus operative to protect the AKA vectors and to not reveal them, and also to ensure that the AKA vectors are not repeated. From the base station's perspective, if either the SIM card 10 or the AAA component 131 is an imposter, the AKA protocol would not be satisfied, and if both are imposters.

The disclosed embodiments further provide protection against so-called "bad neighbor" attacks. These attacks involve a "bad neighbor" base station's cell may attempt to overpower a friendly neighbor's handset so that the friendly neighbor's calls go through the attacker's base station, and the attacker may eavesdrop on such calls. In the implementations of the disclosure, if the attacker's base station 110 has a vault 20 then eavesdropping cannot happen, and an operator can ensure that all the base stations 110 in its network have a secure vault 20. While it is difficult to provide protection for handsets that roam to a different operator's base station, an operator can try to protect its handset users by requiring that the handsets can place calls only through the operator's base stations and only via base stations deployed by its trusted partners, for instance, using policies that all of the base stations run by the operator have a secure vault 20 and any roaming partner whose base station can carry an operator's handsets call should also have a secure vault 20.

The present disclosure also contemplates associating a single SIM card 10 with multiple base stations 110. For example, each base station vault 20 could send RAND/AUTN queries (e.g., message 320 in FIG. 3B) to such a SIM card 10 and receive a corresponding response (e.g., 321). In accordance with the disclosure, however, such undesirable usage can be mitigated or avoided by the AAA component 131 ensuring that the SIM card 10 can only be associated with one base station ID at any given time. In this manner, a SIM card 10 may be used in one base station 110 for a time and may thereafter be switched to another station 110. It may be important to periodically re-verify the availability of the SIM card/secure cell-site vault association.

Other alternative implementations are possible, wherein the various aspects of the disclosure are amenable to variations of the tunnel establishment. The disclosure facilitates leveraging a base station manufacturer's certificate installed in the vault 20 so that the network operator does not need to deal with a separate secret key in each vault 20 and does not require that the key also be known and provisioned in the operator's AAA/AuC. For example, while TLS/SSL tunnel may be employed as described above in the verification of the vault 20 by the AAA component 131 and in the tunnel establishment, other public key protocols may also be employed, wherein all such alternative implementations are contemplated as falling within the scope of the present disclosure. Moreover, while the above embodiments are illustrated and described as using a CK and IK in the SIM card 10 to create a security association between the SIM card 10 and the vault 20, and no tunnel is required between the SIM card 10 and the AAA component 131, if such a tunnel is desired, the AKA pseudorandom function f3 can be used to create CK1=f3(CK, "1"), CK2=f3(CK,"2") and IK1=f3(IK,"1"), IK2=f3(IK, "2"). With this, CK1 and IK1 can be used to establish a secured tunnel between the SIM card 10 and the AAA component 131, whereas CK2 and IK2 can be used for the security association 30 between the SIM card 10 and the vault 20.

The present disclosure further contemplates a method for securing a base station using a SIM card. The method includes operatively coupling the SIM card (e.g., card 10 above) to the base station (e.g., base station 110), and establishing a secure tunnel between a secure portion of the base station (e.g., vault 20) and an authentication component (e.g., AAA component 131) of a core communications network (e.g., core network 130 above). A secure association (e.g., association 30 above) is established between the SIM card and the secure portion of the base station, and this secure association establishment is confirmed to the authentication component. In certain embodiments, the establishment of the secure tunnel between the secure portion of the base station and the authentication component is accomplished by an IKE protocol, a TLS protocol, or an Authentication and Key Agreement (AKA) procedure. In addition, the secure association may be established between the SIM card and the secure portion of the base station by executing a UMTS AKA procedure. In the above described system, for example, the process can be employed with respect to the SIM card 10 in a base station 110 with a secure (vault) portion 20 and the AAA component 131 of the core network 130, where the AAA component may be with or without a secure gateway 137. In the above implementation, the AAA component 131 can be pre-provisioned with a vault key (Kv) and a SIM key (Ks), where Kv can be a public/private key pair or a secret key, and Ks in one implementation can be a shared secret key in exactly the same fashion as in the USIM/SIM used for cell phones. The vault 20 and the AAA component 131 set up a secure tunnel via a protocol such as IKE, TLS, or even some AKA procedure, and the vault and SIM card establish contact and execute UMTS-AKA in one example. The vault 20 executes the protocol to the AAA component 131 of the core network 130 through the tunnel, or alternatively the AAA component 131 can signal the Ks to the vault 20 to allow the vault 20 to run the protocol itself. The AAA component 131 then uses the successful completion of UMTS-AKA between the USIM/SIM 10 and the AAA component 131 as the establishment of the SIM card 10 on the particular Femto base station 110.

Although the various aspects of the disclosure have been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the disclosure. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A base station, comprising:
   a subscriber identity module (SIM) card operatively coupled with the base station, the SIM card comprising a first security management component operatively coupled with a core network to facilitate one or more security functions in the base station;
   a secure cell-site vault comprising:
      one or more security function components for performing security operations with respect to communications packets handled by the base station, and
      a second security management component operative with the first security management component to establish a secure association with the SIM card to facilitate one or more security functions in the base station; and
   an unsecure portion comprising a radio interface operative to communicate with wireless mobile terminals, and a line interface operative to communicate with the core network;
   wherein the second security management component of the secure cell-site vault is operative with the first security management component to establish the secure association between the SIM card and the secure cell-site vault to facilitate the one or more security functions in the base station;
   wherein the first and second security management components facilitate generation of session keys for the one or more security function components;
   wherein the SIM card establishes at least one vault-gateway session key for a secure tunnel between the secure cell-site vault and a secure gateway of the core network, and the SIM card sends the at least one vault-gateway session key to the secure cell-site vault using the secure association established between the SIM card and the secure cell-site vault;
   wherein the secure cell-site vault confirms establishment of the secure association between the SIM card and the secure cell-site vault to an authentication component of the core network; and
   wherein the second security management component of the secure cell-site vault is operative with the first security management component to establish the secure association between the SIM card and the secure cell-site vault by executing a Universal Mobile Telecommunications System (UMTS) Authentication and Key Agreement (AKA) procedure.

2. The base station of claim 1, wherein the one or more security function components perform encryption or decryption security operations with respect to communications packets handled by the base station.

3. The base station of claim 1, wherein the one or more security function components include:
   a first encryption component to perform encryption and decryption security operations with respect to communications packets transferred between the base station and a radio interface of a wireless mobile terminal; and
   a second encryption component to perform encryption and decryption security operations with respect to communications packets transferred between the base station and a line interface of the core network.

4. The base station of claim 3, wherein the base station is an integrated base station for a femto cell, pico cell, micro cell or other type of cell.

5. The base station of claim 1, wherein the base station is an integrated base station for a femto cell, pico cell, micro cell or other type of cell.

6. The base station of claim 1, wherein the first and second security management components transfer at least one session key for the one or more security function components using the secure association established between the SIM card and the secure cell-site vault.

7. The base station of claim 6, wherein the one or more security function components include:
   a first encryption component to perform encryption and decryption security operations with respect to communications packets transferred between the base station and a radio interface of a wireless mobile terminal; and
   a second encryption component to perform encryption and decryption security operations with respect to communications packets transferred between the base station and a line interface of the core network.

8. The base station of claim 7, wherein the base station is an integrated base station for a femto cell, pico cell, micro cell or other type of cell.

9. The base station of claim 6, wherein the base station is an integrated base station for a femto cell, pico cell, micro cell or other type of cell.

10. A base station, the base station being adapted to receive a subscriber identity module (SIM) card comprising:
    a secure cell-site vault comprising:
       one or more security function components for performing security operations with respect to communications packets handled by the base station, and
       a cell-site vault security management component adapted to be operative with a first security management component of an installed SIM card operatively coupled with the base station to establish a secure association with the installed SIM card to provide encrypted communication between the SIM card and the secure cell-site vault to facilitate one or more security functions in the base station; and
    an unsecure portion comprising a radio interface operative to communicate with wireless mobile terminals, and a line interface operative to communicate with a core network;
    wherein the cell-site vault security management component of the secure cell-site vault is operative with the first security management component to establish the secure association between the SIM card and the secure cell-site vault to facilitate the one or more security functions in the base station;
    wherein the first security management component and the cell-site vault security management component facilitate generation of session keys for the one or more security function components;
    wherein the secure cell-site vault receives at least one vault-gateway session key for a secure tunnel between the secure cell-site vault and a secure gateway of the core network using the secure association established between the SIM card and the secure cell-site vault;
    wherein the secure cell-site vault confirms establishment of the secure association between the SIM card and the secure cell-site vault to an authentication component of the core network; and
    wherein the cell-site vault security management component of the secure cell-site vault is operative with the first security management component to establish the secure association between the SIM card and the secure cell-site vault by executing a Universal Mobile Telecommunications System (UMTS) Authentication and Key Agreement (AKA) procedure.

11. The base station of claim 10, wherein the one or more security function components include:

a first encryption component to perform encryption and decryption security operations with respect to communications packets transferred between the base station and a radio interface of a wireless mobile terminal; and a second encryption component to perform encryption and decryption security operations with respect to communications packets transferred between the base station and a line interface of the core network.

12. The base station of claim 11, wherein the base station is an integrated base station for a femto cell, pico cell, micro cell or other type of cell.

13. The base station of claim 11, wherein the first security management component and the cell-site vault security management component transfer at least one session key for the one or more security function components using the secure association established between the SIM card and the secure cell-site vault.

14. The base station of claim 10, wherein the base station is an integrated base station for a femto cell, pico cell, micro cell or other type of cell.

15. The base station of claim 10, wherein the first security management component and the cell-site vault security management component transfer at least one session key for the one or more security function components using the secure association established between the SIM card and the secure cell-site vault.

16. A base station, comprising:
a subscriber identity module (SIM) card operatively coupled with the base station, the SIM card comprising a first security management component operatively coupled with a core network to facilitate one or more security functions in the base station;
a secure cell-site vault comprising:
   means for performing security operations with respect to communications packets handled by the base station, and
   a security management means operative with the first security management component for establishing a secure association with the SIM card to provide encrypted communication between the SIM card and the secure cell-site vault to facilitate one or more security functions in the base station; and
an unsecure portion comprising a radio interface operative to communicate with wireless mobile terminals, and a line interface operative to communicate with the core network;
wherein the means for performing security operations of the secure cell-site vault is operative with the first security management component to establish the secure association between the SIM card and the secure cell-site vault to facilitate the one or more security functions in the base station;
wherein the first security management component and the means for performing security operations facilitate generation of session keys for the one or more security function components;

wherein the SIM card establishes at least one vault-gateway session key for a secure tunnel between the secure cell-site vault and a secure gateway of the core network, and the SIM card sends the at least one vault-gateway session key to the secure cell-site vault using the secure association established between the SIM card and the secure cell-site vault;

wherein the secure cell-site vault confirms establishment of the secure association between the SIM card and the secure cell-site vault to an authentication component of the core network; and wherein the means for performing security operations of the secure cell-site vault is operative with the first security management component to establish the secure association between the SIM card and the secure cell-site vault by executing a Universal Mobile Telecommunications System (UMTS) Authentication and Key Agreement (AKA) procedure.

17. The base station of claim 16, wherein the means for performing security operations comprises:
a first encryption component to perform encryption and decryption security operations with respect to communications packets transferred between the base station and a radio interface of a wireless mobile terminal; and
a second encryption component to perform encryption and decryption security operations with respect to communications packets transferred between the base station and a line interface of the core network.

18. The base station of claim 17, wherein the first security management component and the security management means transfer at least one session key for the one or more security function components using the secure association established between the SIM card and the secure cell-site vault.

19. The base station of claim 17, wherein the base station is an integrated base station for a femto cell, pico cell, micro cell or other type of cell.

20. The base station of claim 16, wherein the base station is an integrated base station for a femto cell, pico cell, micro cell or other type of cell.

21. The base station of claim 16, wherein the first security management component and the security management means transfer at least one session key for the one or more security function components using the secure association established between the SIM card and the secure cell-site vault.

* * * * *